United States Patent
Januszewski et al.

(10) Patent No.: US 10,448,422 B2
(45) Date of Patent: Oct. 15, 2019

(54) UPLINK GRANT DETECTION FOR PARTIAL TIME DIVISION MULTIPLEXING MODE

(71) Applicant: Nokia Solutions and Networks Oy, Espoo (FI)

(72) Inventors: Maciej Januszewski, Pila (PL); Karri Markus Ranta-Aho, Esoii (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/309,645

(22) PCT Filed: May 8, 2014

(86) PCT No.: PCT/EP2014/059462
§ 371 (c)(1),
(2) Date: Nov. 8, 2016

(87) PCT Pub. No.: WO2015/169376
PCT Pub. Date: Nov. 12, 2015

(65) Prior Publication Data
US 2017/0156159 A1    Jun. 1, 2017

(51) Int. Cl.
*H04W 72/14* (2009.01)
*H04L 1/00* (2006.01)
*H04W 72/12* (2009.01)

(52) U.S. Cl.
CPC ........... *H04W 72/14* (2013.01); *H04L 1/0057* (2013.01); *H04W 72/1289* (2013.01)

(58) Field of Classification Search
CPC .. H04W 72/14; H04W 72/1289; H04L 1/0057
See application file for complete search history.

(56) References Cited

U.S. PATENT DOCUMENTS

| | | | |
|---|---|---|---|
| 7,613,157 B2* | 11/2009 | Pan | H04W 72/1289 370/277 |
| 9,271,306 B2* | 2/2016 | Dural | H04W 72/0446 |
| 9,392,440 B2* | 7/2016 | Goransson | H04B 7/0404 |
| 2007/0025300 A1 | 2/2007 | Terry et al. | |
| 2008/0187070 A1 | 8/2008 | Kim et al. | |

(Continued)

FOREIGN PATENT DOCUMENTS

WO    2011/162707 A1    12/2011

OTHER PUBLICATIONS

International Search Report and Written Opinion received for corresponding Patent Cooperation Treaty Application No. PCT/EP2014/059462, dated Feb. 5, 2015, 11 pages.

*Primary Examiner* — Phuc H Tran
(74) *Attorney, Agent, or Firm* — Squire Patton Boggs (US) LLP

(57) ABSTRACT

Systems, methods, apparatuses, and computer program products for 'partial' time division multiplexing (TDM) operation are provided. One example of a method includes transmitting, by a base station, an Enhanced Absolute Grant Channel (E-AGCH) message to one or more user equipment. The E-AGCH message may comprise an indication of one of a first type grant or a second type grant indicating whether a grant is susceptible to grant detection. The first type of grant is considered susceptible to grant detection, and the second type of grant is considered not susceptible to grant detection.

17 Claims, 6 Drawing Sheets

(56) References Cited

U.S. PATENT DOCUMENTS

| | | | |
|---|---|---|---|
| 2010/0023833 A1* | 1/2010 | Pan | H04W 72/1289 714/748 |
| 2013/0195044 A1* | 8/2013 | Pelletier | H04W 72/04 370/329 |
| 2013/0201952 A1* | 8/2013 | Grant | H04B 1/707 370/329 |
| 2013/0229906 A1* | 9/2013 | Akkarakaran | H04L 5/0044 370/216 |
| 2013/0336231 A1* | 12/2013 | Ankel | H04W 72/1268 370/329 |
| 2014/0036808 A1* | 2/2014 | Pelletier | H04W 72/14 370/329 |
| 2014/0078959 A1* | 3/2014 | Goransson | H04B 7/0404 370/328 |
| 2014/0247732 A1* | 9/2014 | Yang | H04W 36/0088 370/252 |
| 2015/0280880 A1* | 10/2015 | Yang | H04L 5/0053 370/329 |
| 2016/0056944 A1* | 2/2016 | Cave | H04W 72/02 370/336 |
| 2016/0302190 A1* | 10/2016 | Aminaka | H04W 72/0406 |
| 2016/0309422 A1* | 10/2016 | Wang | H04W 52/146 |
| 2018/0220446 A1* | 8/2018 | Sesia | H04L 1/0045 |

\* cited by examiner

UPLINK GRANT DETECTION FOR PARTIAL TIME DIVISION MULTIPLEXING MODE

RELATED APPLICATION

This application was originally filed as Patent Cooperation Treaty Application No. PCT/EP2014/059462 filed May 8, 2014.

BACKGROUND

Field

Certain embodiments of the invention generally relate to time division multiplexing (TDM) operation in High Speed Uplink Packet Access (HSUPA).

Description of the Related Art

Time division multiplexing (TDM) operation in High Speed Uplink Packet Access (HSUPA) is one of the topics considered within the Work Item on Further Enhancements to Enhanced Uplink being held in the $3^{rd}$ generation partnership project (3GPP) RAN1 (e.g., RP-132078: "New Work Item proposal: Further EUL enhancements", Ericsson™, RAN #62). The TDM scheduling refers to a situation in which one or several selected User Equipment entities (UEs) in a given cell consume most of the Rise over the Thermal (RoT) budget by transmitting with a high data rate for the duration of a scheduling period (from several Transmission Time Intervals (TTIs) to several tens/hundreds of TTIs); while, at the same time, other UEs either stop their transmission or their transmission consumes significantly less power resources (low data rate).

In the purest form of TDM operation, at any given time only one UE is transmitting data, and the other UEs with active connection are awaiting for their turn to transmit. Typically, each transmission duration is allowed to continue only for a short period of time so that the data flows of all active users still appear as simultaneous from the users' perspective.

SUMMARY

One embodiment is directed to a method including transmitting, by a base station, an Enhanced Absolute Grant Channel (E-AGCH) message to at least one user equipment. The E-AGCH message comprises an indication of one of a first type grant or a second type grant indicating whether a grant is susceptible to grant detection. The first type of grant is considered susceptible to grant detection, and the second type of grant is considered not susceptible to grant detection.

In an embodiment, when the E-AGCH message comprises the indication of the first type of grant and the at least one user equipment detects an E-AGCH transmission to another user equipment, the at least one user equipment changes the grant to zero grant or inactive grant. In another embodiment, when the E-AGCH message comprises the indication of the second type of grant, the at least one user equipment maintains the grant even when the E-AGCH is used to provide grants to other user equipment.

According to one embodiment, the at least one user equipment is configured with a first Enhanced Radio Network Temporary Identity (E-RNTI) and a second Enhanced Radio Network Temporary Identity (E-RNTI). In an embodiment, the indication of the first type of grant comprises the first E-RNTI used as a Cyclic Redundancy Check (CRC) mask to indicate the grant is susceptible to grant detection, and the indication of the second type of grant comprises the second E-RNTI used as a Cyclic Redundancy Check (CRC) mask to indicate the grant is not susceptible to grant detection.

According to an embodiment, the indication of the first type of grant comprises a scope bit set to a predefined value to indicate the grant is susceptible to grant detection, and the indication of the second type of grant comprises a scope bit set to a predefined value to indicate the grant is not susceptible to grant detection. In one embodiment, the zero grant is tagged with an identifier for identifying a source of the zero grant.

Another embodiment is directed to an apparatus including at least one processor and at least one memory including computer program code. The at least one memory and computer program code are configured, with the at least one processor, to cause the apparatus at least to transmit an Enhanced Absolute Grant Channel (E-AGCH) message to at least one user equipment. The E-AGCH message comprises an indication of one of a first type grant or a second type grant indicating whether a grant is susceptible to grant detection. The first type of grant is considered susceptible to grant detection, and the second type of grant is considered not susceptible to grant detection.

Another embodiment is directed to an apparatus including transmitting means for transmitting an Enhanced Absolute Grant Channel (E-AGCH) message to at least one user equipment. The E-AGCH message comprises an indication of one of a first type grant or a second type grant indicating whether a grant is susceptible to grant detection. The first type of grant is considered susceptible to grant detection, and the second type of grant is considered not susceptible to grant detection.

Another embodiment is directed to a computer program product, for example embodied on a computer readable medium, the computer program product storing a computer program that, when executed by a processer, causes the processor to perform a process including transmitting an Enhanced Absolute Grant Channel (E-AGCH) message to at least one user equipment. The E-AGCH message comprises an indication of one of a first type grant or a second type grant indicating whether a grant is susceptible to grant detection. The first type of grant is considered susceptible to grant detection, and the second type of grant is considered not susceptible to grant detection.

Another embodiment is directed to a method including receiving, by a user equipment, an Enhanced Absolute Grant Channel (E-AGCH) message comprising an indication of one of a first type grant or a second type grant indicating whether a grant is susceptible to grant detection. The first type of grant is considered susceptible to grant detection, and the second type of grant is considered not susceptible to grant detection.

In an embodiment, when the E-AGCH message comprises the indication of the first type of grant and the user equipment detects an E-AGCH transmission to another user equipment, changing the grant to zero grant or inactive grant. In another embodiment, when the E-AGCH message comprises the indication of the second type of grant, maintaining the grant even when the E-AGCH is used to provide grants to other user equipment.

According to one embodiment, the user equipment is configured with a first Enhanced Radio Network Temporary Identity (E-RNTI) and a second Enhanced Radio Network Temporary Identity (E-RNTI). In an embodiment, the indication of the first type of grant may comprise the first E-RNTI used as a Cyclic Redundancy Check (CRC) mask to indicate the grant is susceptible to grant detection, and the indication of the second type of grant may comprise the second E-RNTI used as a Cyclic Redundancy Check (CRC) mask to indicate the grant is not susceptible to grant detection.

In one embodiment, the indication of the first type of grant comprises a scope bit set to a predefined value to indicate the grant is susceptible to grant detection, and the indication of the second type of grant comprises a scope bit set to a predefined value to indicate the grant is not susceptible to grant detection.

According to on embodiment, the method may further include tagging the zero grant with an identifier for identifying a source of the zero grant.

Another embodiment is directed to an apparatus including at least one processor and at least one memory including computer program code. The at least one memory and computer program code are configured, with the at least one processor, to cause the apparatus at least to receive an Enhanced Absolute Grant Channel (E-AGCH) message comprising an indication of one of a first type grant or a second type grant indicating whether a grant is susceptible to grant detection. The first type of grant is considered susceptible to grant detection, and the second type of grant is considered not susceptible to grant detection.

Another embodiment is directed to an apparatus including receiving means for receiving an Enhanced Absolute Grant Channel (E-AGCH) message comprising an indication of one of a first type grant or a second type grant indicating whether a grant is susceptible to grant detection. The first type of grant is considered susceptible to grant detection, and the second type of grant is considered not susceptible to grant detection.

Another embodiment is directed to a computer program product, for example embodied on a computer readable medium, the computer program product storing a computer program that, when executed by a processor, causes the processor to perform a process including receiving an Enhanced Absolute Grant Channel (E-AGCH) message comprising an indication of one of a first type grant or a second type grant indicating whether a grant is susceptible to grant detection. The first type of grant is considered susceptible to grant detection, and the second type of grant is considered not susceptible to grant detection.

BRIEF DESCRIPTION OF THE DRAWINGS

For proper understanding of the invention, reference should be made to the accompanying drawings, wherein.

DETAILED DESCRIPTION

Figure 1:
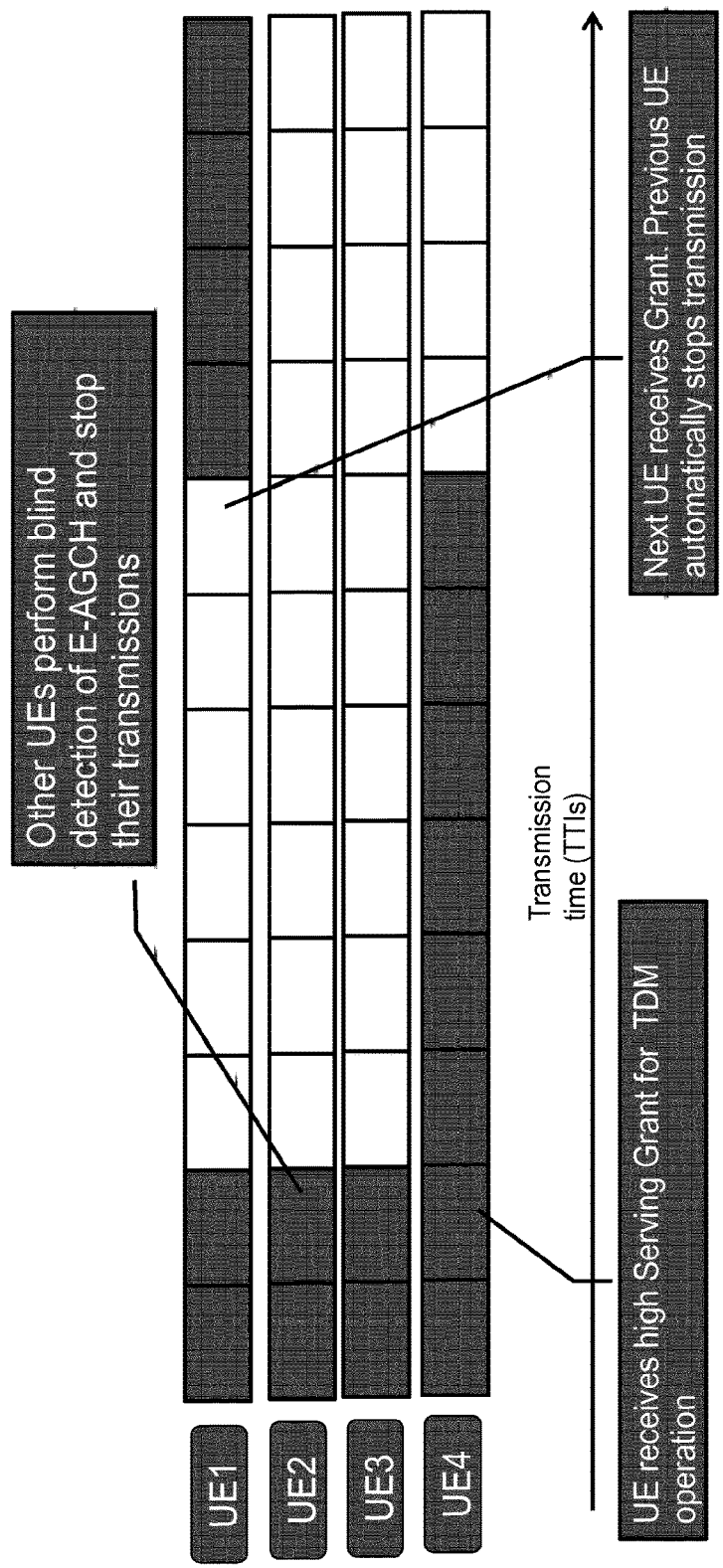
FIG. 1 illustrates an example of a grant detection operation.

It will be readily understood that the components of the invention, as generally described and illustrated in the figures herein, may be arranged and designed in a wide variety of different configurations. Thus, the following detailed description of the embodiments of systems, methods, apparatuses, and computer program products for 'partial' TDM operation, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, in the TDM mode, the UEs would be scheduled in such a way that they take turns in transmitting the uplink data and their transmission do not interfere with each other. Since it has been shown that uplink TDM operation can bring substantial performance gains in Wideband Code Division Multiplex Access (WCDMA)/HSPA uplink (UL), several standard changes have been proposed within the 3GPP Work Item in order to facilitate efficient TDM operation in HSUPA.

TDM Grant Detection is the working assumption in 3GPP, and is likely to be standardized in 3GPP Release 12 (Rel-12). The HSUPA operates in such a way that the Node B manages a Serving Grant (SG) of each UE. The SG of a UE controls the data rate it is allowed to transmit. The SG of a UE is changed with Absolute Grant and Relative Grant commands transmitted on Enhanced Absolute Grant Channel (E-AGCH) and Enhanced Relative Grant Channel (E-RGCH) channels, respectively. Therefore, the scheduling in HSUPA is based on SGs, which imposes the E-DPDCH/DPCCH power ratio for a given UE. Grants are sent to the UEs over E-AGCH channel (absolute value of the grant is sent to a given UE) or over E-RGCH channel (relative grants, information on whether the current grant should be increased or decreased).

TDM scheduling can be realized in the conventional 3GPP WCDMA system. However, the signalling overhead is significant. It is assumed that in the TDM mode the BS (e.g., NodeB) has to nominate one UE which will transmit for the next period, while another UE transmitting in the previous period has to be informed that it has to stop the transmission. For that 2 commands have to be issued:

1. E-AGCH with either ZERO, INACTIVE or very low Absolute Grant Value addressing the UE transmitting in the previous period
2. E-AGCH with Absolute Grant Value for a UE nominated to transmit in the next period. Typically, in TDM mode, the absolute grant value is relatively high.

After sending the ZERO-grant to currently transmitting UE one TTI is lost (no UE transmitting with high datarate in the next TTI) before the next UE receives and applies new absolute grant because only one absolute grant may be transmitted per TTI. This reduces gains coming from the TDM scheduling.

In case of the Grant Detection solution proposed for Rel-12, there is no gap between two different UEs transmissions as the same scheduler command (transmitted on E-AGCH) allowing a new UE to start transmitting is interpreted by the currently active UE to stop transmitting at the same time. FIG. 1 illustrates a grant detection operation according to this example. The signaling overhead of constantly changing the UEs' Serving Grants (SG) controlling the data rate is minimized as only one E-AGCH command is needed to move the permission to transmit from one UE to another one (as opposed to two commands, one telling the currently active UE to stop and another one to tell the next UE to start). In the example of FIG. 1, this is achieved by a UE not only monitoring the E-AGCH channel for SGs addressed to it but also detecting SG transmissions addressed to other UEs in a cell and stopping its transmission automatically upon detection of such a E-AGCH transmission.

An additional element which has been raised in 3GPP is scheduling of multiple simultaneous UEs in TDM mode. As mentioned above, grant Detection in its pure form allows only one UE to transmit at a time but in some cases it might be beneficial to allocate a relatively smaller amount of resources to another UE which would transmit simultaneously to the "primary" TDM UE, i.e., when the currently active TDM UE is not able to utilize the full cell capacity (RoT budget) by itself either due to power limitation or other factors. Moreover, in case of advanced base station (BS) receivers with Interference Cancellation it could be more optimal to keep at least two active UEs. To allow for flexible scheduling of more than one simultaneous UE some additional changes have to be made to the basic Grant Detection concept. Embodiments of the invention provide an efficient solution for allowing Grant Detection with additional support of multiple simultaneous UEs.

As discussed above and depicted in FIG. 1, in Grant Detection mode, a UE is monitoring the E-AGCH channel not only for the Grant information addressed to that UE but also for Grant messages sent to other UEs in a cell. If such a transmission occurs, the UE automatically changes its Serving Grant to Zero Grant, thus stopping the transmission and allowing the newly scheduled UE to utilize full cell capacity. A UE knows that the E-AGCH transmission is addressed to it when it passes the UE-specific Cyclic Redundancy Check (CRC). The normal CRC is masked with a UE specific identifier to make the CRC UE-specific. In HSUPA context, this is achieved by using the UE Enhanced Radio Network Temporary Identity (E-RNTI) as the UE-specific CRC mask. The process is specified in 3GPP TS 25.212 section 4.10.2 (e.g., version 6.3.0), CRC attachment for E-AGCH. According to 3GPP Release 6 specifications (e.g., TS 25.331 v6.6.0), the UE may be assigned two E-RNTIs, a primary and secondary E-RNTI.

With Grant Detection, a UE has to detect that the E-AGCH power is above a certain threshold even if the CRC check fails so that it can be determined that an E-AGCH transmission to another UE took place. There can be more than one E-AGCH set up in a cell, but a single UE can be configured to monitor only one E-AGCH channel. This is enough to ensure that the Grant Detection also works properly in a presence of legacy UEs by assigning two different E-AGCH channels (Orthogonal Variable Spreading Factor (OVSF) codes) to the legacy UEs and new TDM UEs of Rel-12. In this way, grants transmitted to the legacy UEs will not be detected by the TDM UEs and will not interfere with the TDM operation of that group. This means that the TDM UEs can operate in pure TDM fashion with only one of them transmitting at a time while the legacy UEs can be scheduled to transmit simultaneously.

However, the above-described approach does not allow for the TDM UEs to operate in a partial TDM mode where one TDM UE uses most of the cell capacity at the time and an additional TDM UE(s) is scheduled simultaneously to utilize the remaining cell resources, or for example to benefit from interference cancellation receivers that are capable of cancelling one dominant interferer from another, and thus could support a small number of simultaneous high-rate transmissions.

Figure 2:
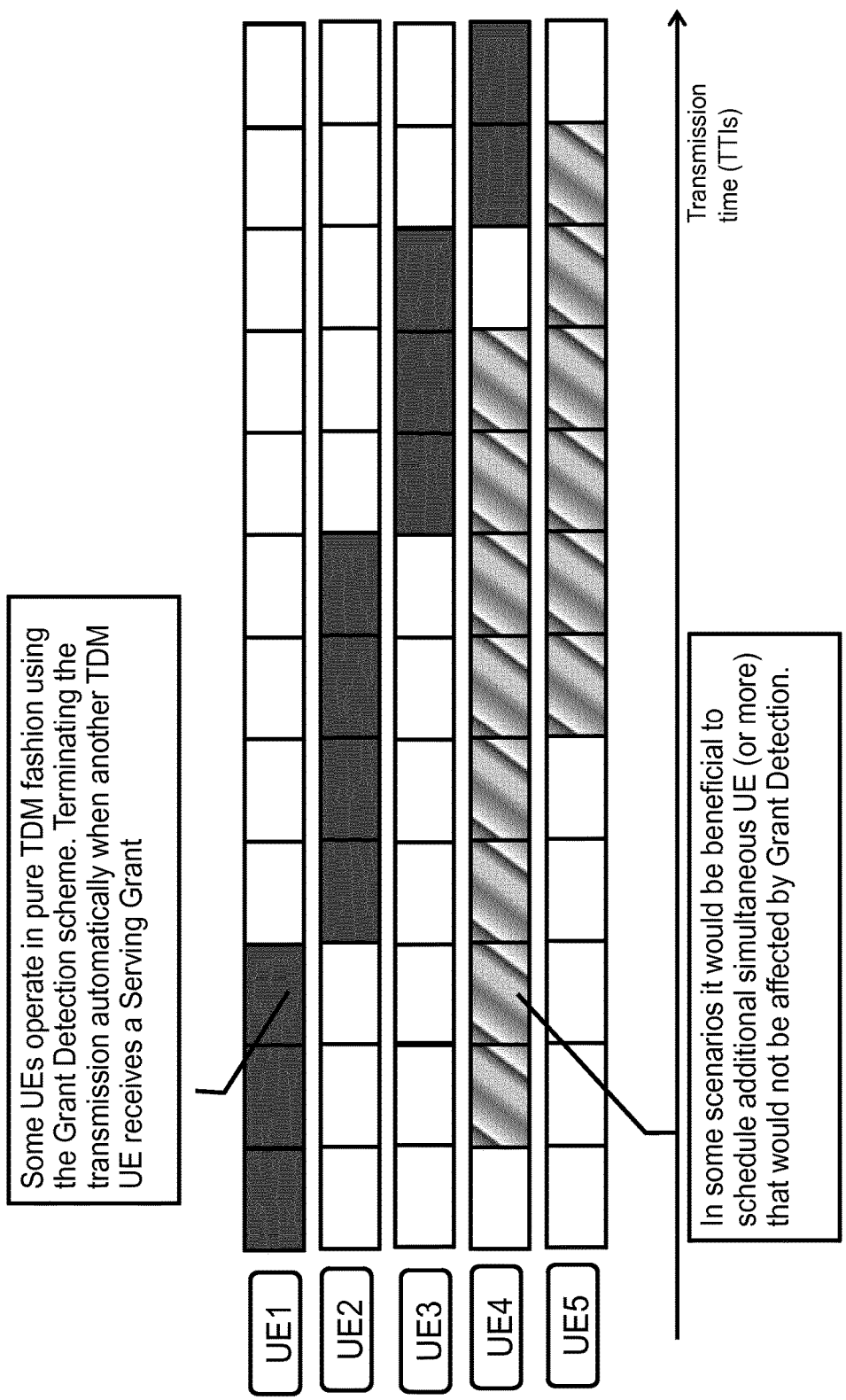
FIG. 2 illustrates a mode of operation for grant detection with additional UEs scheduled simultaneously, according to an embodiment.

FIG. 2 illustrates a mode of operation for Grant Detection with additional UEs scheduled simultaneously, according to an embodiment of the invention. Along with the UEs switching turns to transmit in the Grant Detection fashion, embodiments provide an additional flexibility to schedule some simultaneous transmissions. The mode of operation depicted in FIG. 2 would not be possible with the current Grant Detection scope (shown in FIG. 1) as UEs 1 and 2 would detect additional Grants being sent to UEs 4 and 5, and would automatically stop their transmissions at the corresponding timeslots. On the other hand assigning UEs 4 and 5 with a different E-AGCH channel would mean that they can only send additional transmissions "in the background" but cannot enter the pure TDM operation with all the other Rel-12 UEs in that cell.

Since the current Grant Detection scheme does not allow for scheduling of more than one simultaneous UE at a time and such functionality would be beneficial in a number of cases (e.g., interference cancellation nodeB receivers), embodiments of the invention are able to provide this missing flexibility by using different types of absolute grants and different E-RNTIs or Grant scope bits as Grant identifiers.

In order to allow for 'partial' TDM operation where several (but not all) UEs are scheduled to transmit simultaneously, certain embodiments configure the E-AGCH message to contain additional information on whether the received grant is to be susceptible to grant detection or not. In one embodiment, when the UE receives a grant of the first type on E-AGCH, this received grant is considered susceptible to grant detection, i.e., if the UE detects that there was an E-AGCH transmission to another UE (its CRC check fails for both E-RNTIs), it will revert to Zero_Grant. In an embodiment, when the UE receives a grant of the second type on E-AGCH, the received grant is considered not susceptible to grant detection, i.e., the UE will maintain the received grant even if the E-AGCH channel is used to provide grants to other UEs.

Several options for separating the first and the second type of grant are provided. One option includes configuring the UE with two UE-IDs (e.g., E-RNTIs), and the used E-RNTI separates the two types of grants. Another option includes using the scope-bit of the E-AGCH message to separate the two types of grants. A third option of using two separate E-AGCH channelization codes is also possible, but this would consume twice the code space in the cell's code tree and require the UE to receive two E-AGCH channels.

Additionally, as another option, the grant-detection based Zero_Grant (the UE detecting an E-AGCH message meant for another UE) may be tagged by the UE layer 1 with an identifier (e.g., secondary grant, or grant detection grant) when delivered to the UE MAC layer. It should be noted that this tagging option for the Zero Grant can work simultaneously with any of the other options discussed above. While being able to distinguish between two types of Grants, the UE MAC layer may still need to distinguish between the sources of the two types of Zero Grants (those are different types of Grants than in the previous options, one is Zero Grant coming from Grant Detection and the other one is Zero Grant coming from a legacy E-AGCH message). For instance, when the serving grant is not susceptible to Grant Detection the UE MAC layer needs to know whether the new Zero Grant is a Grant Detection one (which should be ignored) or a legacy one which should be followed.

As mentioned above, in an embodiment, the UE can be configured with two E-RNTIs that lend the received E-AGCH message a different meaning. According to one embodiment, when the UE receives a grant on E-AGCH with the first E-RNTI used as the CRC mask, this received grant is susceptible to grant detection. Accordingly, if the UE detects that there was an E-AGCH transmission to another UE (its CRC check fails for both E-RNTIs), it will revert to Zero_Grant.

According to another embodiment, when the UE receives a grant on E-AGCH with the second E-RNTI used as the CRC mask, the received grant is not susceptible to grant detection. Thus, in this embodiment, the UE will maintain the received grant even if the E-AGCH channel is used to provide grants to other UEs.

Figure 3:
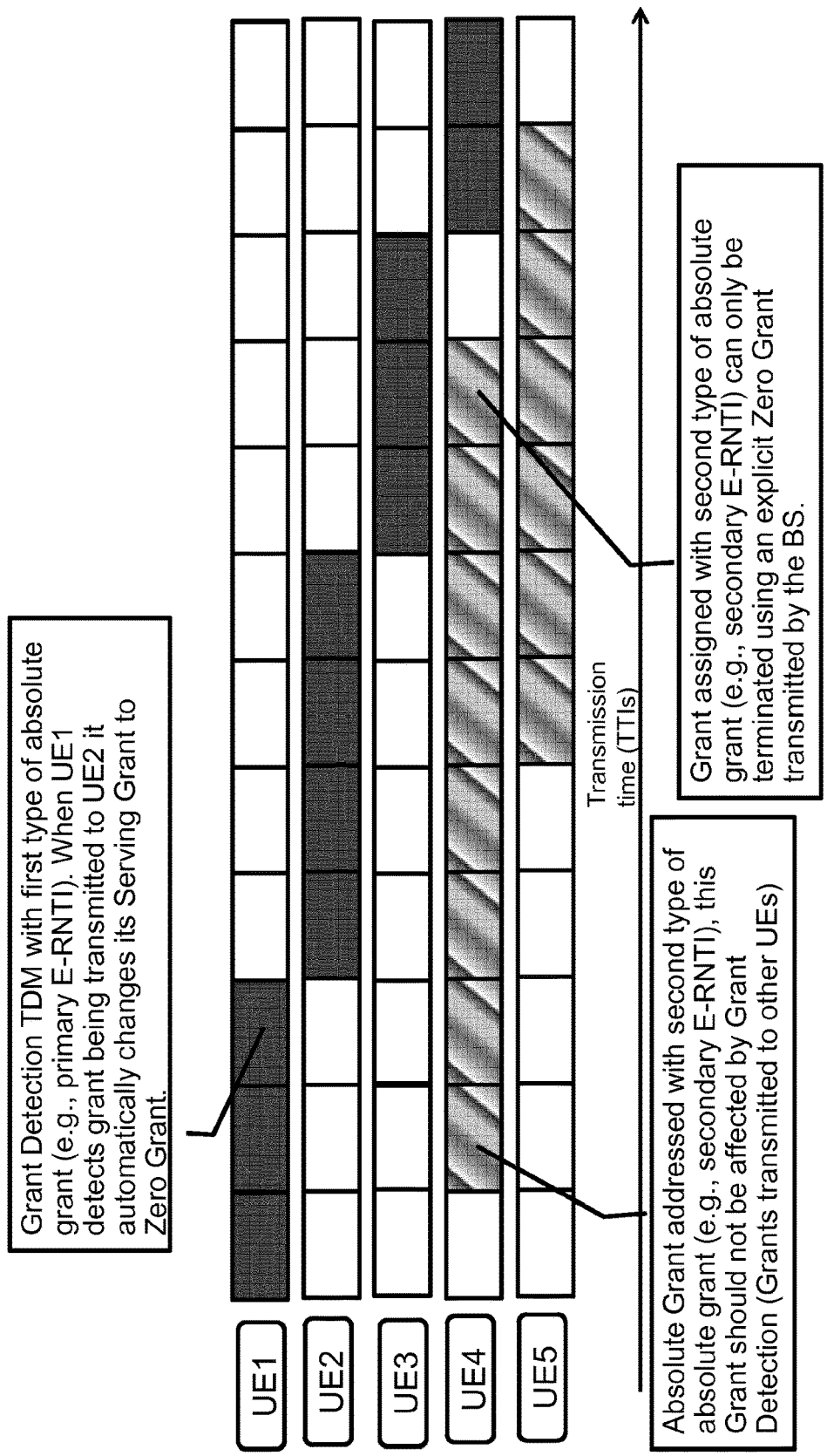
FIG. 3 illustrates an example of TDM operation with grant detection using a primary and secondary E-RNTI, according to an embodiment.

FIG. 3 illustrates an example of TDM operation with Grant Detection using a first type and second type of absolute grant, such as a primary and secondary E-RNTI, according to an embodiment. One embodiment may distinguish between two types of Serving Grants by using primary and secondary E-RNTIs, as the two E-RNTIs are already present in the specification. As depicted in FIG. 3, for example, the grants obtained with primary-E-RNTI-coded E-AGCH message may be treated as the TDM Grants being the subject of Grant Detection, while the grants obtained with secondary E-RNTI may be treated as persistent ones.

As outlined above, one embodiment uses the scope-bit of the E-AGCH message to separate the two types of grants. In one embodiment, when the UE receives a grant on E-AGCH with the scope bit set to '0', this received grant is susceptible to grant detection. As a result, if the UE detects that there was an E-AGCH transmission to another UE (its CRC check fails for both E-RNTIs), it will revert to Zero_Grant. In another embodiment, when the UE receives a grant on E-AGCH scope bit set to '1', the received grant is not susceptible to grant detection. Therefore, the UE will maintain the received grant even if the E-AGCH channel is used to provide grants to other UEs. In another embodiment, the scope-bit may provide an indication of a grant which is susceptible to grant detection which triggers the UE to revert to Zero Grant or provide an indication of a grant which is not susceptible to grant detection, which triggers the UE maintain the received grant. The scope-bit may be encoded by a first predefined value indicating a grant which is susceptible to grant detection or a second predefined value indicating a grant which is not susceptible to grant detection or other numerical values or enumerations allowing to distinguish the grant types.

Based on the embodiments discussed above, the Base Station can schedule TDM UEs with more flexibility which will translate into performance gains. Certain embodiments may be especially valuable in a scenario when a single TDM UE is not able to fully utilize cell resources and therefore the purest form of TDM would not be the optimal approach. In the case of an advanced BS receiver with interference cancellation, it may be more beneficial to always have at least 2 UEs transmitting at a given time.

The implementation in the 3GPP specification would mean introducing a different Serving Grant Update procedure in 3GPP TS 25.321 section 11.8.1.3 for primary and secondary Grants for the TDM mode. For example, the Serving Grant tagged with a primary identity type may be treated as "persistent" and may only be terminated with an explicit Zero Grant. The Serving Grant with a secondary identity type may be terminated by both Grant Detection and explicit Zero Grant message sent over E-AGCH. Additionally, to avoid introduction of new tags (source information), the Zero Grant obtained through the Grant Detection may be tagged with the secondary identity type, while the traditional explicit Zero Grant may always be tagged with a primary identity type. In this way, the MAC layer would be aware of the origin of the Zero grant and would know whether or not to apply it if the current serving Grant is persistent (in case of a non-persistent Serving Grant, the Zero Grant origin does not matter as both should terminate the Serving Grant in the same way).

The E-AGCH construction (5-bit grant, 1-bit scope and 16-bit CRC masked with one of the two E-RNTIs and then encoded for transmission on the E-AGCH channelization code) is detailed in 3GPP TS 25.212 section 4.10 (e.g., version 6.3.0):

The Xagv bits carry the 5-bit Absolute Grant Value

The Xags bit carries the Absolute Grant Scope

The ID-specific CRC attachment attaches the 16-bit CRC masked with E-RNTI after the 6-bit message.

Figure 4A:
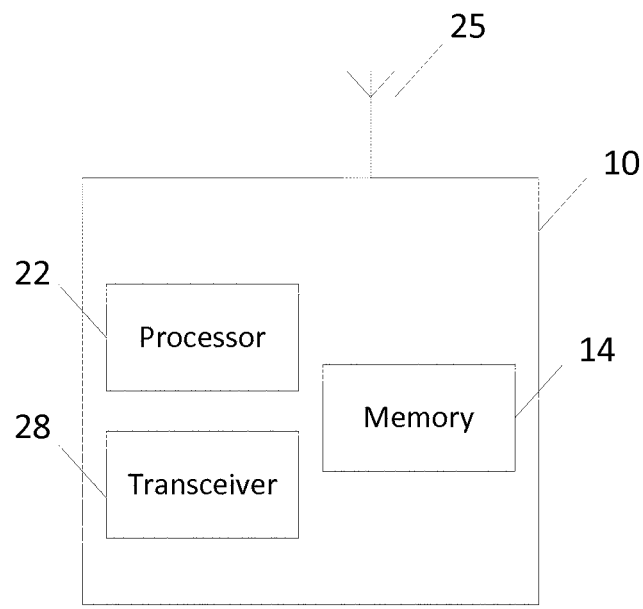
FIG. 4a illustrates an example of an apparatus, according to one embodiment.

FIG. 4a illustrates an example of an apparatus 10 according to an embodiment. In an embodiment, apparatus 10 may be a node, host, or server in a communications network or serving such a network, such as a base station or enhanced node B (eNB) in LTE. It should be noted that one of ordinary skill in the art would understand that apparatus 10 may include components or features not shown in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. In some embodiments, the transceiver may be an external device, such as a remote radio head. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a base station or eNB, for example. In this embodiment, apparatus 10 may be controlled by memory 14 and processor 22 to transmit an E-AGCH message to at least one user equipment. The E-AGCH message may include an indication of either a first type grant or a second type grant for indicating whether a grant is susceptible to grant detection. In one embodiment, the first type of grant is considered susceptible to grant detection, and the second type of grant is considered not susceptible to grant detection.

According to an embodiment, when the E-AGCH message includes the indication of the first type of grant and the at least one user equipment detects an E-AGCH transmission to another user equipment, the at least one user equipment changes the grant to zero grant or inactive grant. In an embodiment, when the E-AGCH message comprises the indication of the second type of grant, the at least one user equipment maintains the grant even when the E-AGCH is used to provide grants to other user equipment.

In one embodiment, the at least one user equipment is configured with a first Enhanced Radio Network Temporary Identity (E-RNTI) and a second Enhanced Radio Network Temporary Identity (E-RNTI). According to an embodiment, the indication of the first type of grant may include the first E-RNTI used as a Cyclic Redundancy Check (CRC) mask indicating the grant is susceptible to grant detection. In one embodiment, the indication of the second type of grant may include the second E-RNTI used as a Cyclic Redundancy Check (CRC) mask indicating the grant is not susceptible to grant detection.

In another embodiment, the indication of the first type of grant may include a scope bit set to a predefined value indicating the grant is susceptible to grant detection. For example, the predefined value may be '0' to indicate that the grant is susceptible to grant detection. In yet another embodiment, the indication of the second type of grant comprises a scope bit set to a predefined value indicating the grant is not susceptible to grant detection. For example, the predefined value may be '1' to indicate that the grant is not susceptible to grant detection.

Figure 4B:
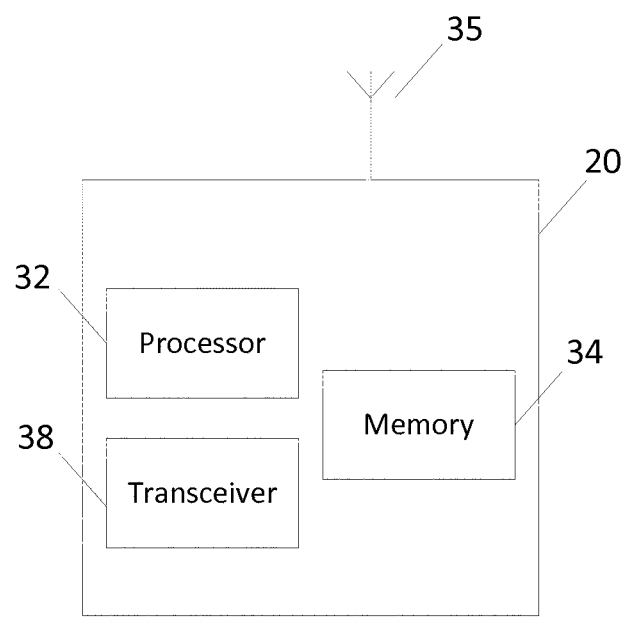
FIG. 4b illustrates an example of an apparatus, according to another embodiment.

FIG. 4b illustrates an example of an apparatus 20 according to another embodiment. In an embodiment, apparatus 20 may be a node or mobile device in a communications network, such as a UE in LTE, for example. It should be noted that one of ordinary skill in the art would understand that apparatus 20 may include components or features not shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include or be coupled to one or more antennas 35 for transmitting and receiving signals and/or data to and from apparatus 20. Apparatus 20 may further include or be coupled to a transceiver 38 configured to transmit and receive information. In some embodiments, the transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile station in a communications network, such as a UE in WCDMA/HSPA or LTE network. In this embodiment, apparatus 20 may be controlled by memory 34 and processor 32 to receive an E-AGCH message that may include an indication of either a first type grant or a second type grant to indicate whether a grant is susceptible to grant detection. In an embodiment, the first type of grant is considered susceptible to grant detection, and the second type of grant is considered not susceptible to grant detection.

According to one embodiment, when the E-AGCH message includes the indication of the first type of grant and the apparatus detects an E-AGCH transmission to another user equipment, apparatus 20 may be controlled by memory 34 and processor 32 to change the grant to zero grant or inactive grant. In another embodiment, when the E-AGCH message includes the indication of the second type of grant, apparatus 20 may be controlled by memory 34 and processor 32 to maintain the grant even when the E-AGCH is used to provide grants to other user equipment.

In one embodiment, apparatus 20 is configured with a first Enhanced Radio Network Temporary Identity (E-RNTI) and a second Enhanced Radio Network Temporary Identity (E-RNTI). According to an embodiment, the indication of the first type of grant includes the first E-RNTI used as a Cyclic Redundancy Check (CRC) mask indicating the grant is susceptible to grant detection. In another embodiment, the indication of the second type of grant comprises the second E-RNTI used as a Cyclic Redundancy Check (CRC) mask indicating the grant is not susceptible to grant detection.

In another embodiment, the indication of the first type of grant may include a scope bit set to a predefined value indicating the grant is susceptible to grant detection. For example, the predefined value may be '0' to indicate that the grant is susceptible to grant detection. In yet another embodiment, the indication of the second type of grant comprises a scope bit set to a predefined value indicating the grant is not susceptible to grant detection. For example, the predefined value may be '1' to indicate that the grant is not susceptible to grant detection.

Figure 5A:
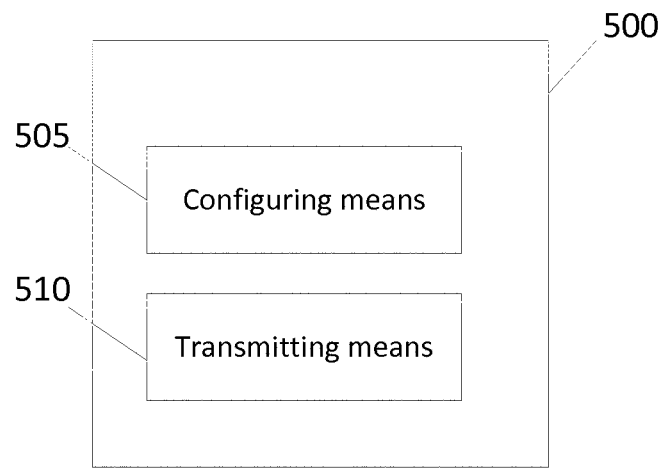
FIG. 5a illustrates an example of an apparatus, according to one embodiment.

FIG. 5a illustrates an example of an apparatus 500 according to another embodiment. As illustrated in FIG. 5a, apparatus 500 may include configuring means 505 for configuring a message to include an indication of either a first type of grant or a second type of grant. In an embodiment, the message is a message transmitted on an E-AGCH. According to one embodiment, the indication of the first type of grant or the second type of grant is to indicate whether a grant is susceptible to grant detection. Apparatus 500 may further include transmitting means 510 for transmitting the message including the indication of whether the grant is susceptible to grant detection over the E-AGCH to at least one UE.

Figure 5B:
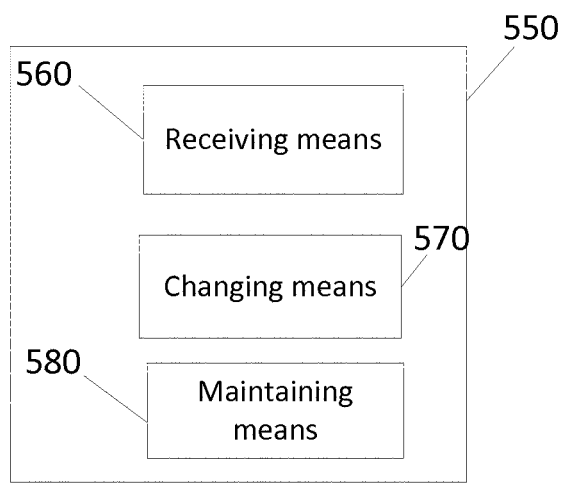
FIG. 5b illustrates an example of an apparatus, according to another embodiment.

FIG. 5b illustrates an example of an apparatus 550 according to another embodiment. As illustrated in FIG. 5b, apparatus 550 may include receiving means 560 for receiving a message including an indication of either a first type of grant or a second type of grant. In an embodiment, the message is a message transmitted on an E-AGCH. According to one embodiment, the indication of the first type of grant or the second type of grant is to indicate to apparatus 550 whether a grant is susceptible to grant detection. In one embodiment, apparatus 550 may further include changing means 570 for changing the grant to zero grant, or inactive grant, when the E-AGCH message includes the indication of the first type of grant and the apparatus 550 detects an E-AGCH transmission to another user equipment. According to an embodiment, apparatus 550 may also include maintaining means 580 for maintaining the grant even when the E-AGCH is used to provide grants to other user equipment.

Figure 6A:
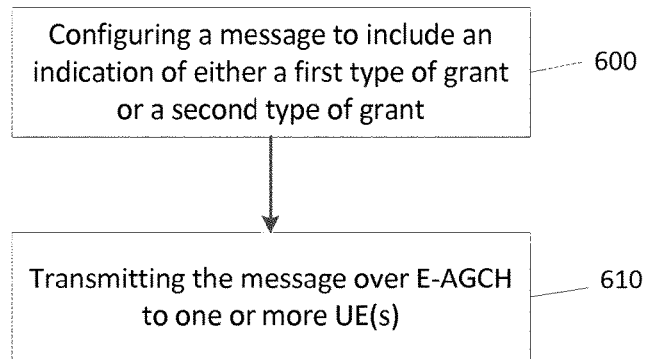
FIG. 6a illustrates a flow diagram of a method, according to one embodiment.

FIG. 6a illustrates an example flow diagram of a method, according to one embodiment. In one example, the method of FIG. 6a may be performed by a network entity in a communications network, such as a base station or eNB in LTE. In an embodiment, the method may include, at 600, configuring a message to include an indication of either a first type of grant or a second type of grant. In an embodiment, the message is a message transmitted on an E-AGCH. According to one embodiment, the indication of the first type of grant or the second type of grant is to indicate whether a grant is susceptible to grant detection. The method may further include, at 610, transmitting the message including the indication of whether the grant is susceptible to grant detection over the E-AGCH to at least one UE.

Figure 6B:
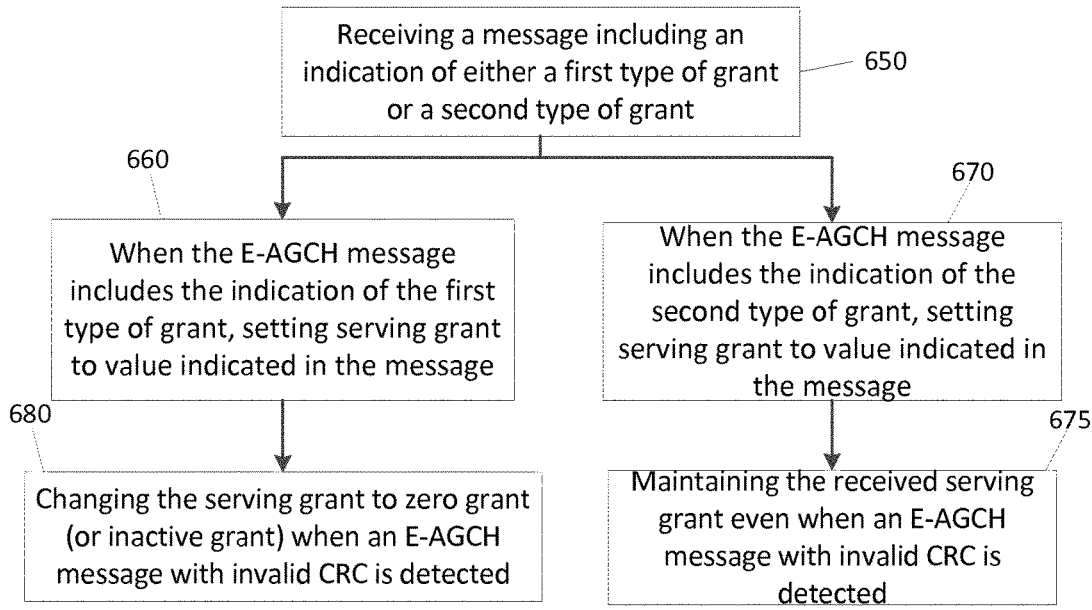
FIG. 6b illustrates a flow diagram of a method, according to another embodiment.

FIG. 6b illustrates an example flow diagram of a method, according to one embodiment. In one example, the method of FIG. 6b may be performed by a network entity in a communications network, such as a mobile station or UE in WCDMA/HSPA or LTE, for example. In an embodiment, the method may include, at 650, receiving a message including an indication of either a first type of grant or a second type of grant. In an embodiment, the message is a message transmitted on an E-AGCH. According to one embodiment, the indication of the first type of grant or the second type of grant is to indicate to the UE whether a grant is susceptible to grant detection. In one embodiment, the method may also include, at 660, setting the serving grant to the value indicated in the received message when the message includes an indication of a first type of grant. Then, at 680, the method may include changing the serving grant to zero grant (or inactive grant) when the E-AGCH message includes the indication of the first type of grant and the UE detects an E-AGCH message with invalid CRC (e.g., E-AGCH using some other UE's E-RNTI). According to an embodiment, the method may also include, at 670, setting the serving grant to the value indicated in the received message when the message includes an indication of a second type of grant. Then, the method may include, at 675, maintaining the received serving grant even when an E-AGCH message with invalid CRC is detected.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising: at least one processor; and at least one memory including computer program code, the at least one memory and computer program code configured, with the at least one processor, to cause the apparatus at least to transmit an Enhanced Absolute Grant Channel (E-AGCH) message to at least one user equipment, wherein the E-AGCH message comprises an indication of one of a first type grant or a second type grant indicating whether a grant is susceptible to grant detection, wherein the first type of grant is considered susceptible to grant detection, and wherein the second type of grant is considered not susceptible to grant detection, wherein, when the E-AGCH message comprises the indication of the first type of grant and the at least one user equipment detects an E-AGCH transmission to another user equipment, the at least one user equipment changes the grant to zero grant or inactive grant.

2. The apparatus according to claim 1, wherein, when the E-AGCH message comprises the indication of the second type of grant, the at least one user equipment maintains the grant even when the E-AGCH is used to provide grants to other user equipment.

3. The apparatus according to claim 1, wherein the at least one user equipment is configured with a first Enhanced Radio Network Temporary Identity (E-RNTI) and a second Enhanced Radio Network Temporary Identity (E-RNTI).

4. The apparatus according to claim 3, wherein at least one of: the indication of the first type of grant comprises the first E-RNTI used as a cyclic redundancy check mask indicating the grant is susceptible to grant detection; and the indication of the second type of grant comprises the second E-RNTI used as a cyclic redundancy check mask indicating the grant is not susceptible to grant detection.

5. The apparatus according to claim 1, wherein the indication comprises a E-AGCH scope bit indicating the grant is susceptible to grant detection or not susceptible to grant detection.

6. A method, comprising: receiving, by a user equipment, an Enhanced Absolute Grant Channel (E-AGCH) message comprising an indication of one of a first type grant or a second type grant indicating whether a grant is susceptible to grant detection, wherein the first type of grant is considered susceptible to grant detection, wherein the second type of grant is considered not susceptible to grant detection, and wherein, when the E-AGCH message comprises the indication of the first type of grant and the user equipment detects an E-AGCH transmission to another user equipment, changing, by the user equipment, the grant to zero grant or inactive grant.

7. The method according to claim 6, wherein, when the E-AGCH message comprises the indication of the second type of grant, maintaining the grant even when the E-AGCH is used to provide grants to other user equipment.

8. The method according to claim 6, wherein the user equipment is configured with a first Enhanced Radio Network Temporary Identity (E-RNTI) and a second Enhanced Radio Network Temporary Identity.

9. The method according to claim 8, wherein at least one of: the indication of the first type of grant comprises the first E-RNTI used as a cyclic redundancy check mask to indicate the grant is susceptible to grant detection; and the indication of the second type of grant comprises the second E-RNTI used as a cyclic redundancy check mask to indicate the grant is not susceptible to grant detection.

10. The method according to claim 6, wherein the indication comprises a E-AGCH scope bit indicating the grant is susceptible to grant detection or not susceptible to grant detection.

11. The method according to claim 6, further comprising tagging the zero grant with an identifier for identifying a source of the zero grant.

12. An apparatus, comprising: at least one processor; and at least one memory including computer program code, the at least one memory and computer program code configured, with the at least one processor, to cause the apparatus at least to receive an Enhanced Absolute Grant Channel (E-AGCH) message comprising an indication of one of a first type grant or a second type grant indicating whether a grant is susceptible to grant detection, wherein the first type of grant is considered susceptible to grant detection, wherein the second type of grant is considered not susceptible to grant detection, and wherein, when the E-AGCH message comprises the indication of the first type of grant and the apparatus detects an E-AGCH transmission to another user equipment, the apparatus is further caused to at least change the grant to zero grant or inactive grant.

13. The apparatus according to claim 12, wherein, when the E-AGCH message comprises the indication of the second type of grant, the apparatus is further caused to at least maintain the grant even when the E-AGCH is used to provide grants to other user equipment.

14. The apparatus according to claim 12, wherein the apparatus is configured with a first Enhanced Radio Network Temporary Identity (E-RNTI) and a second Enhanced Radio Network Temporary Identity.

15. The apparatus according to claim 12, wherein at least one of: the indication of the first type of grant comprises the first E-RNTI used as a cyclic redundancy check mask indicating the grant is susceptible to grant detection; and the indication of the second type of grant comprises the second E-RNTI used as a cyclic redundancy check mask indicating the grant is not susceptible to grant detection.

16. The apparatus according to claim 12, wherein the indication comprises a E-AGCH scope bit indicating the grant is susceptible to grant detection or not susceptible to grant detection.

17. The apparatus according to claim 12, further comprising tagging means for tagging the zero grant with an identifier for identifying a source of the zero grant.

* * * * *